United States Patent
Kleinknecht et al.

(10) Patent No.: US 10,704,443 B2
(45) Date of Patent: Jul. 7, 2020

(54) METHOD FOR CONTROLLING AN SCR SYSTEM HAVING TWO METERING VALVES

(71) Applicant: Robert Bosch GmbH, Stuttgart (DE)

(72) Inventors: Horst Kleinknecht, Fichtenberg (DE); Stefan Janssen, Marbach am Neckar (DE)

(73) Assignee: Robert Bosch GmbH, Stuttgart (DE)

(*) Notice: Subject to any disclaimer, the term of this patent is extended or adjusted under 35 U.S.C. 154(b) by 31 days.

(21) Appl. No.: 15/928,724

(22) Filed: Mar. 22, 2018

(65) Prior Publication Data

US 2018/0274420 A1  Sep. 27, 2018

(30) Foreign Application Priority Data

Mar. 24, 2017 (DE) .......................... 10 2017 204 973

(51) Int. Cl.
*F01N 3/20* (2006.01)
*B01D 53/94* (2006.01)

(52) U.S. Cl.
CPC ......... *F01N 3/208* (2013.01); *B01D 53/9409* (2013.01); *B01D 53/9418* (2013.01); *B01D 53/9495* (2013.01); *B01D 2255/904* (2013.01); *F01N 2610/02* (2013.01); *F01N 2610/146* (2013.01); *F01N 2610/1433* (2013.01); *F01N 2900/1821* (2013.01); *Y02T 10/24* (2013.01)

(58) Field of Classification Search
CPC ................. F01N 3/208; F01N 2610/02; F01N 2610/146; F01N 2900/1821
See application file for complete search history.

(56) References Cited

U.S. PATENT DOCUMENTS

| | | | |
|---|---|---|---|
| 2007/0113544 A1* | 5/2007 | Nishina | F01N 3/2066 60/286 |
| 2007/0163239 A1 | 7/2007 | Hofmann et al. | |
| 2007/0243120 A1* | 10/2007 | Sato | B01D 53/9431 423/239.1 |
| 2014/0363358 A1* | 12/2014 | Udd | F01N 3/106 423/212 |
| 2015/0196878 A1 | 7/2015 | Nunez et al. | |
| 2015/0275730 A1* | 10/2015 | Gupta | F01N 3/208 60/274 |

FOREIGN PATENT DOCUMENTS

| | | | | |
|---|---|---|---|---|
| DE | 2706436 A1 | 8/1978 | | |
| DE | 10346220 | 4/2005 | | |
| DE | 102010029340 A1 * | 12/2011 | ............. | F01N 3/208 |
| DE | 102010029340 A1 | 12/2011 | | |

* cited by examiner

*Primary Examiner* — Audrey K Bradley
(74) *Attorney, Agent, or Firm* — Michael Best & Friedrich LLP

(57) ABSTRACT

A method for controlling an SCR system having two metering valves and a feed pump, wherein the two metering valves are operated in such a way that a reducing agent solution is metered in simultaneously via the two metering valves, at least over part of a metering time period ($t_{Dos}$).

6 Claims, 4 Drawing Sheets

METHOD FOR CONTROLLING AN SCR SYSTEM HAVING TWO METERING VALVES

BACKGROUND OF THE INVENTION

The present invention relates to a method for controlling an SCR system having two metering valves, wherein a reducing agent solution is metered in simultaneously via the two metering valves. Furthermore, the invention relates to a computer program which carries out each step of the method if it is running on a computer, and to a machine-readable storage medium which stores the computer program. Finally, the invention relates to an electronic control unit which is designed to carry out the method according to the invention.

Nowadays, the SCR method (Selective Catalytic Reduction) is used in the aftertreatment of exhaust gases from an internal combustion engine in order to reduce nitrogen oxides (NOx) in the exhaust gas. DE 103 46 220 A1 describes the basic principle. Here, a 32.5% aqueous urea solution (AUS), also known commercially as AdBlue®, is metered into the oxygen-rich exhaust gas. Typically, a metering valve within a metering module is provided for this purpose in order to meter the AUS into the exhaust gas flow upstream of an SCR catalytic converter. In the SCR catalytic converter, the AUS reacts to form ammonia, which then combines with the nitrogen oxides, forming water and nitrogen. The AUS is fed to the metering module from a reducing agent tank, through a pressure line, by means of a feed module comprising a feed pump.

SCR systems are furthermore known in which a plurality of SCR catalytic converters is arranged in the exhaust line, acting in combination on the exhaust gas. In this case, the exhaust line can furthermore be branched upstream of the SCR catalytic converters. The AUS metering operations then take place either via a common metering valve, which is arranged upstream of the two SCR catalytic converters, or via a plurality of metering valves, wherein each SCR catalytic converter is assigned a metering valve positioned upstream. By means of the latter, the desired mass of reducing agent solution can be metered in accurately. Typically, the metering valves are connected to a common feed module, wherein the metering valves share at least part of a common pressure line.

SUMMARY OF THE INVENTION

The method relates to an SCR system having two metering valves and a feed pump, which pumps reducing agent solution out of a reducing agent tank and makes it available to the metering valves. In particular, the two metering valves can be connected to the feed pump by at least part of a common pressure line. The two metering valves are operated in such a way that a reducing agent solution is metered in simultaneously via the two metering valves, at least over part of a metering time period. Each metering valve is preferably positioned ahead of a separate SCR catalytic converter and meters the reducing agent solution directly into its associated SCR catalytic converter.

The metering valves can be filled as follows: by means of the feed pump, reducing agent solution is pumped out of the reducing agent tank and a pressure is built up in the SCR system. Both metering valves are then opened simultaneously or with a short offset. As a result, the two pressure lines for the two pressure valves are filled simultaneously. This offers the advantage, in particular, that the metering valves need only be opened and closed once. Apart from the lower consumption of materials, this is also associated with minimization of noises which occur during opening and closing. The added mass of reducing agent solution is correlated with the activation time of the metering valves and can be calculated from said time.

During each of the metering operations, the respective metering valve can preferably be operated as follows: at the beginning, the metering valve is supplied with an electric current, causing the metering valve to open. This electric current is then maintained to ensure that the metering valve is in fact (completely) open before the electric current falls to a lower holding plateau, which is sufficient to keep the metering valve open. The metering valve is then closed by reducing the electric current to zero.

Since the metering operations via both metering valves take place simultaneously, parameters of the respective metering operation, e.g. an activation time of the metering valves, can be chosen independently of one another. It is thus possible to meter in the respectively desired mass of reducing agent solution when required, thereby achieving the maximum possible flexibility.

According to an advantageous aspect, the two metering operations can start with a time offset, although they take place simultaneously via the two metering valves at least over part of the metering time period. On the one hand, it is thereby possible to match the timing of the metering operations as required. On the other hand, the two metering valves can be detected independently of one another, in particular also for the case described in detail below where a common electric current used to operate both metering valves is measured jointly. In this case, it is possible to infer back to the individual electric currents from the common electric current and thus indirectly to distinguish which metering valve is being operated in what way. For this purpose, changes in the common electric current are compared with the previously described current characteristic. This offers advantages, particularly with the diagnostic mechanisms that are likewise described below, since it is thereby possible in a simple manner to directly infer a beginning of injection point (BIP), at which the metering operation begins, and to indirectly infer an end of injection point (EIP), at which the metering operation ends.

According to one aspect, each metering operation can be ended with a run-down of the respective metering valve independently of the other metering operation. During the run-down, an electric current used to operate the respective metering valve is reduced, whereupon the metering valve progressively closes. Accordingly, the end of injection points for both metering operations can be chosen independently of one another, thereby enabling the two metering operations to run down independently of one another.

According to another aspect, the two metering operations can be ended simultaneously by quick cutoffs of the respective metering valve. In the quick cutoff, the electric current used to operate the metering valve is reduced instantaneously to zero, as a result of which the metering valve is closed abruptly. As a result, both metering operations are ended at a specifiable point in time, i.e. the end of injection points thereof coincide at this common specifiable point in time. As a consequence, it can be assumed at this point in time that both metering valves are closed (if there is no fault) and, accordingly, no reducing agent solution gets into the exhaust line.

Moreover, parameters for the metering operations can be determined on the basis of this quick cutoff since the end of injection points of the two metering operations are already pre-determined on this basis. An activation time for the respective metering valve is preferably determined on the basis of the quick cutoff thereof or the end of injection point thereof and thus the current beginning of injection point thereof is arranged. Moreover, the metering of the respective mass of reducing agent solution currently needed for the two metering valves can be set precisely. Furthermore, the beginning of injection point at least of the following metering operation can be determined in a simple manner on the basis of the specified end of injection point.

In addition, a waiting time after the closure of at least one of the metering valves can be provided before the subsequent metering operation is carried out. In other words, the waiting time is allowed to expire between two successive metering operations. This applies especially to two successive metering operations which do not take place simultaneously and therefore, in particular, to metering operations in successive metering time periods. It is thereby possible to ensure that the metering valve via which the previous metering operation took place is reliably closed (if there is no fault in the metering valve). The waiting time can be determined empirically, for example. Moreover, the aspect described above, namely that the metering operations can begin with a time offset, can likewise be achieved by means of an individual waiting time for each metering valve.

In general, it is the case that shorter pauses in the sequence of metering operations can be accommodated by virtue of the storage capacity of the SCR catalytic converters.

In an advantageous development, a common electric current, which is used to operate the metering valves, can be measured jointly for both metering valves. As a result, the two individual electric currents for operating each of the metering valves can no longer be measured separately. Since only one common current measurement has to be carried out, instead of two individual current measurements, the number of components can be reduced. As described above, the aspect that the metering operations can begin with a time offset, in particular, offers the advantage of being able to infer the individual electric currents from the common electric current, making it possible to distinguish indirectly which metering valve is being operated in what way. Optionally, the electric current can be measured separately for each metering valve, in particular by providing two measuring devices for the electric current for the separate measurement of the two electric currents, thereby simplifying evaluation and increasing the quality of evaluation.

By means of the above-described control of the SCR system, known diagnostic mechanisms for metering in can be carried out, e.g. determination of a metering mass, determination of the beginning of injection point and of the end of injection point, and measurement and regulation of the electric current for the metering valves etc. In particular, the pressure within the SCR system can be determined by, for example, measuring this pressure by means of a pressure sensor in the pressure line or by determining it by derivation from an electric current of the feed pump in order to come to conclusions about the behavior of the metering valve. A drop in the pressure within the pressure line allows the conclusion that the metering valve is in fact opening, whereas a rise in the pressure within the pressure line allows the conclusion that the metering valve is in fact closing. Moreover, protective metering operations can take place and "burn off mechanisms" can be performed for the metering valve (i.e. deliberate heating of a valve coil if the metering valve is blocked).

There is preferably the possibility of stopping metering via one of the two metering valves in the course of the diagnostic mechanisms, thus ensuring that only diagnostic data from the other metering valve, which is still metering, are detected and that reliable diagnosis thereof is possible.

Similarly to the chosen metering strategy, it is also possible to choose an emptying strategy for the SCR system. In this case, a vacuum is produced and both valves are opened simultaneously or with a short time offset. As a consequence, the reducing agent solution within both metering valves is pumped back into the reducing agent tank via at least part of the pressure line and a return line connected thereto. As a result, both valves are emptied simultaneously and abruptly and the metering valves need only be opened and closed once. Apart from the lower consumption of materials, this is also associated with minimization of noises which occur during opening and closing. The returned mass of reducing agent solution correlates with the activation time of the metering valves and can be calculated from said time. Preferably, provision is made to close both metering valves with the quick cutoff at the end of the emptying process. It is thereby possible to ensure that both metering valves are reliably closed.

The computer program is designed to carry out each step of the method, especially if it is carried out on a computer or control unit. It allows the implementation of the method in a conventional electronic control unit without having to make structural changes thereto. For this purpose, it is stored on the machine-readable storage medium.

Installing the computer program on a conventional electronic control unit gives the electronic control unit which is designed to control the SCR system.

BRIEF DESCRIPTION OF THE DRAWINGS

Illustrative embodiments of the invention are shown in the drawings and explained in greater detail in the following description.

DETAILED DESCRIPTION

Figure 1:
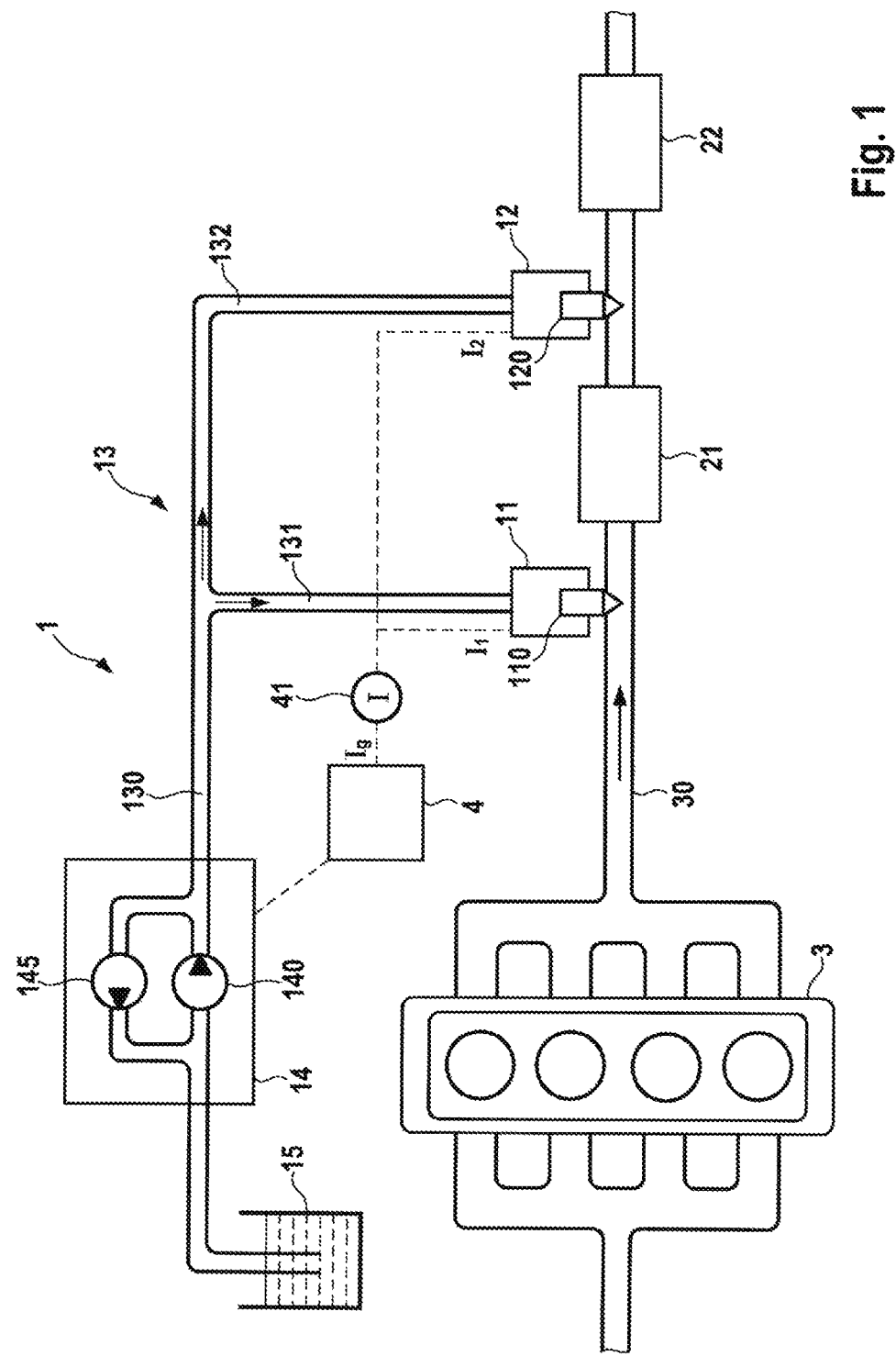
FIG. 1 shows a schematic illustration of an SCR system having two metering valves for two SCR catalytic converters, which can be controlled by means of embodiments of the method according to the invention.

FIG. 1 shows, in a schematic illustration, an SCR system 1 having two metering modules 11, 12 for two SCR catalytic converters 21, 22 in a common exhaust line 30 of an internal combustion engine 3. A first metering module 11 has a first metering valve 110, via which a reducing agent solution is metered into the exhaust line 30 upstream of the first SCR catalytic converter 21. Similarly, a second metering module 12 has a second metering valve 120, via which the reducing agent solution is metered in upstream of the second SCR catalytic converter 22 and, in this illustrative embodiment, downstream of the first SCR catalytic converter 21. The metering modules 11, 12 are connected by a pressure line 13 to a feed module 14, which has a feed pump 140, which pumps the reducing agent solution out of a reducing agent tank 15 into the pressure line 13. Downstream of a common section 130, the pressure line 13 divides into a first section 131, which leads to the first metering module 11, and a second section 132, which leads to the second metering module 12. By means of the feed pump 140 of the feed module 14, the reducing agent solution is made available for metering in to the first metering valve 110 via the first section 131 of the pressure line 13 and to the second metering valve 120 via the second section 132 of the metering line 13. The SCR system 1 operates in a volumetric mode, in which the mass of reducing agent solution supplied by the feed pump 140 is metered in completely by the metering valves 110, 120. The feed pump 140 is operated in such a way that it delivers the entire mass of reducing agent solution needed for both metering valves 110, 120, i.e. the sum of the masses of reducing agent solution needed for each of the two metering valves 110, 120 individually. Consequently, the percentage share of the total mass of reducing agent solution needed is allocated to the respective metering valve 110, 120 as required. As an example, the first metering valve 110 and therefore the first SCR catalytic converter 21 are allocated 20% of the total mass of reducing agent solution needed and, consequently, the second metering valve 120 and the second SCR catalytic converter 22 are allocated 80% of the total mass of reducing agent solution needed. In this illustrative embodiment, the first section 131 is shown as being shorter than the second section 132. In general, it is also possible for the second section 132 to be longer than the first section 131 or for both sections 131, 132 to be of equal length. To empty the SCR system 1, a return pump 145 is provided in the feed module 140, said pump pumping the reducing agent solution back out of the pressure line 130 into the reducing agent tank 15. Furthermore, an electronic control unit 4 is provided, which is connected at least to the feed module 14 or feed pump 140 and the return pump 145 as well as to the two metering modules 11, 12 and both metering valves 110, 120 and can operate these. To operate the metering valves 110, 120, use is made of individual electric currents $I_1$, $I_2$, wherein the first metering valve is operated by means of the first electric current $I_1$ and the second metering valve is operated by means of the second electric current $I_2$. Instead of the individual electric currents $I_1$, $I_2$, a common electric current $I_g$ for both metering valves 110, 120 is measured by a single ammeter 41.

Figure 2:
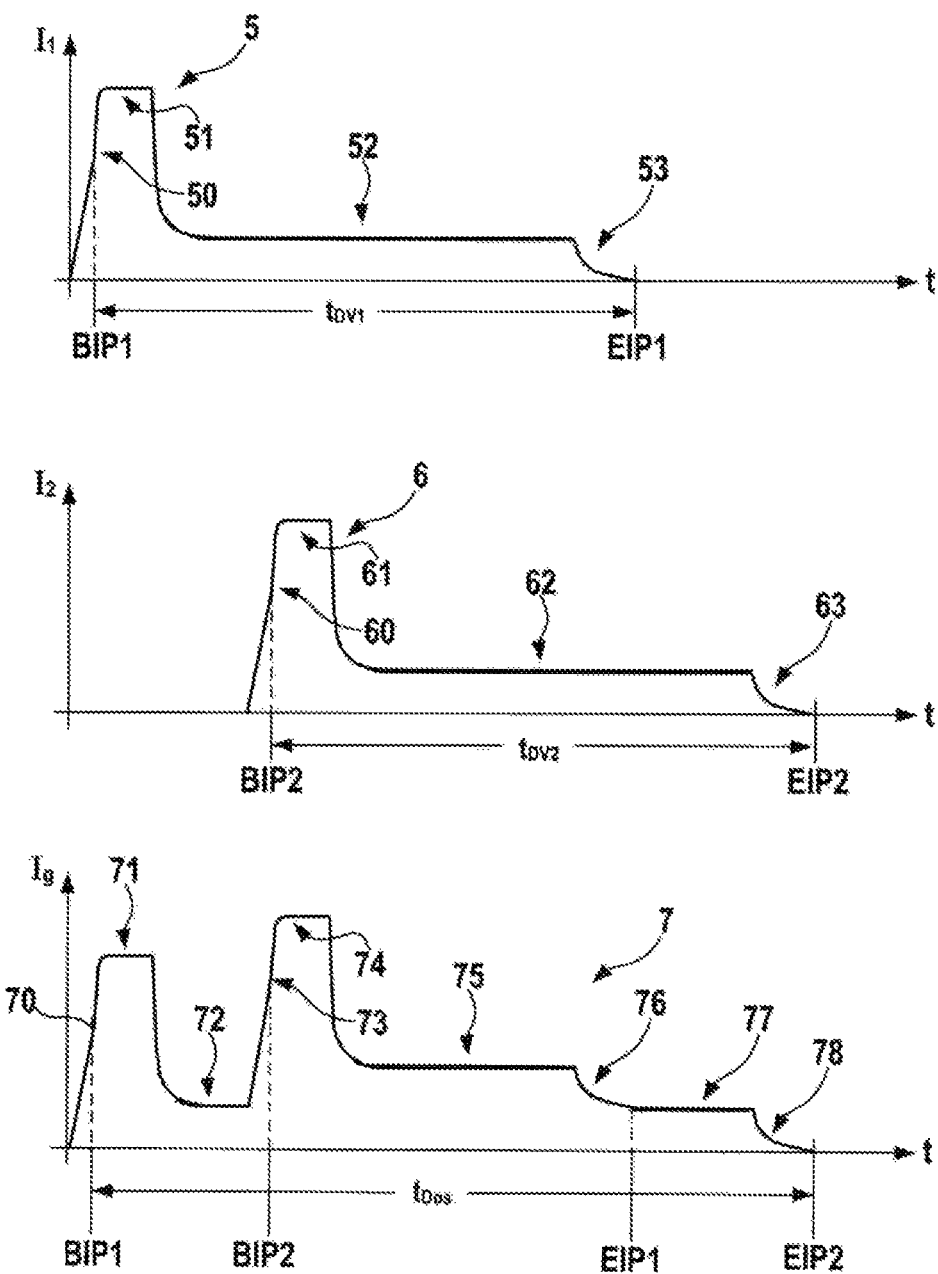
FIG. 2 shows a diagram of individual electric currents and of a common electric current, which are used to operate the metering valves, against time for a first embodiment of the method according to the invention.
Figure 3:
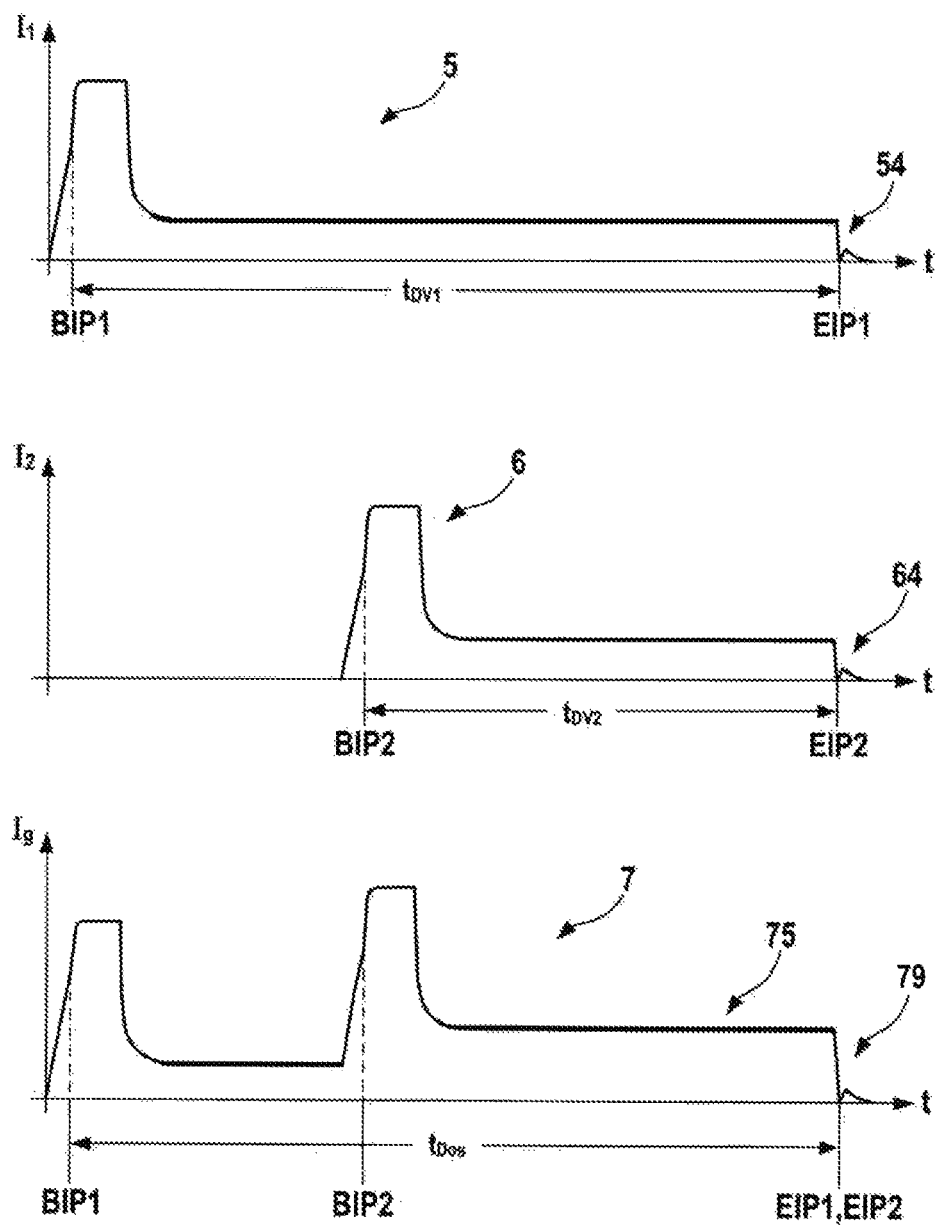
FIG. 3 shows a diagram of individual electric currents and of a common electric current, which are used to operate the metering valves, against time for a second embodiment of the method according to the invention.
Figure 4:
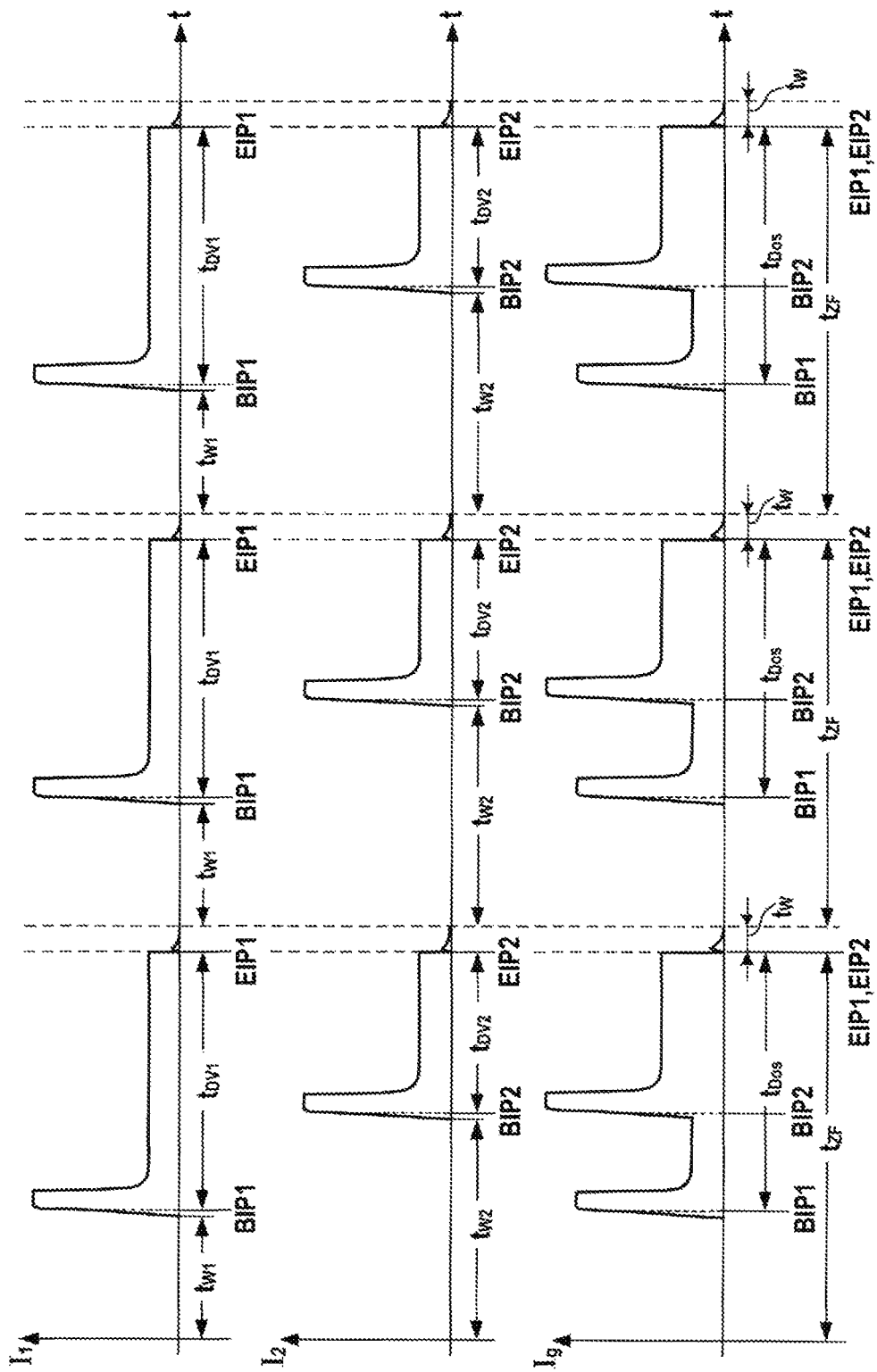
FIG. 4 shows a diagram of individual electric currents and of a common electric current, which are used to operate the metering valves, against time for a third embodiment of the method according to the invention.

FIGS. 2 to 4 each show a diagram of the first electric current $I_1$ in the upper part, of the second electric current $I_2$ in the central part and of the common electric current $I_g$ in the lower part, which are used to operate the metering valves 110, 120, for three embodiments of the method according to the invention. The electric currents $I_1$, $I_2$, $I_g$ are each shown against the same time in the diagrams. Only the common electric current $I_g$ is measured as a combination of the first electric current $I_1$ and of the second electric current $I_2$. As described below, it is possible to infer from this the first electric current $I_1$ and the second electric current $I_2$.

FIG. 2 shows a first embodiment, in which metering operations of the two metering valves 110, 120 take place simultaneously, at least over part of a metering time period $t_{Dos}$. A first current characteristic 5 of the first electric current $I_1$ for the metering of the first metering valve 110 and a second current characteristic 6 of the second electric current $I_2$ for the metering of the second metering valve 120 as well as a third current characteristic 7 of the common $I_g$ for the simultaneous metering of both metering valves 110, 120 are illustrated. The first current characteristic 5 is explained below in detail by way of example. At the beginning, the first current characteristic 5 rises. At a first beginning of injection point BIP1, which is characterized by a kink 50 in the first current characteristic 5, the metering of the first metering valve 110 begins. The first electric current $I_1$ rises until it reaches a peak plateau 51, at which it is held constant to ensure that the first metering valve 110 is reliably opened. The first electric current $I_1$ then falls to a holding plateau 52. Here, the first electric current $I_1$ is sufficient to hold the metering valve 110 open but not too large, in order to reduce unnecessary consumption and heat generation. Especially over the duration of the holding plateau 52, the duration of the metering can be varied. Finally, the metering is ended by a run-down 53 of the first metering valve 110. Here, the first electric current $I_1$ falls to zero and the metering of the first metering valve 110 ends at a first end of injection point EIP1. A time in which metering in is carried out via the first metering valve 110 between the first beginning of injection point BIP1 and the first end of injection point EIP1 is indicated by a first metering time $t_{DV1}$.

In this illustrative embodiment, the metering of the second metering valve 120 begins at a later time than the metering of the first metering valve 110. In other illustrative embodiments, the metering of the second metering valve 120 can begin at an earlier time than the metering of the first metering valve 110, or both can take place simultaneously without a time offset. Moreover, the mass of reducing agent metered in in this illustrative embodiment should be the same for both metering valves 110, 120, and the first section 131 and the second section 132 of the metering line 13 should be of equal length. The second current characteristic 6 for the metering of the second metering valve 120 is formed in the same way as the first current characteristic 5 and is therefore described only briefly. The operation of the second metering valve 120 begins similarly with a rise in the second current characteristic 6. At a kink 60 in the second current characteristic 6, metering via the second metering valve 120 begins with a second beginning of injection point BIP2. The second current characteristic 6 rises further to a second peak plateau 61. The second electric current $I_2$ then falls likewise to a holding plateau 62 until the second metering valve is finally closed with a run-down 63 and the metering thereof ends at a second end of injection point EIP2. A second metering time $t_{DV2}$, in which metering is performed via the second metering valve 120, has the same duration as the first metering time $t_{DV1}$ in this illustrative embodiment, owing to the same mass of reducing agent being metered in and the equal length of the first section 131 and of the second section 132 of the metering line 13. Accordingly, the second end of injection point EIP2 is likewise at a later time than the first end of injection point EIP1.

The third current characteristic 7 represents a combination of the first current characteristic 5 and of the second current characteristic 6 and can be regarded as the sum of both. Since the first current characteristic 5 begins at an earlier time than the second current characteristic 6, a first rise 70 in the third current characteristic 7 and a subsequent first peak plateau 71 corresponds to the rise 50 in the first current characteristic 5 and the peak plateau 51 thereof. The first beginning of injection point BIP1 of the first metering valve 110 is derived directly from the first kink 70 in the first rise in the third current characteristic 7. The third current characteristic 7 then falls to a first holding plateau 72, which corresponds to the first electric current $I_1$ of the holding plateau 52 of the first current characteristic 5 for the first metering valve 110. There follows a second rise in the third current characteristic 7, which likewise has a kink 73, at which, owing to the time offset, the second beginning of injection point BIP2 must be located, at which metering via the second metering valve 120 begins. However, since the third current characteristic 7 is often obscured by noise in practice and, as a result, allows qualitative signal analysis only to a limited extent, a pressure in the common section 130 of the pressure line is determined by a pressure sensor system (not shown), which can be provided by a pressure sensor in the pressure line or by derivation from an electric current of the feed pump 140. From a drop in the pressure after the first rise 70 in the third current characteristic 7 has already taken place, it is possible to infer the second beginning of injection point in the BIP2. The third current characteristic 7 rises to a second peak plateau 74 and is then held constant. The height of this second peak plateau 74 results from the sum of the peak plateau 61 of the second electric current $I_2$ and the holding plateau 52 of the first electric current $I_1$. Following this, the third current characteristic 7 falls to a second holding plateau 75, which is above the first holding plateau 72. The height of the second holding plateau 75 of the third current characteristic 7 is once again a sum of the holding plateau 52 of the first current characteristic 5 and the holding plateau 62 of the second current characteristic 6. The holding plateau 62 of the second current characteristic 6 can be calculated from a difference between the second holding plateau 75 of the third current characteristic 7 and the holding plateau 52 of the first current characteristic 5.

There follows a third drop 76 in the third current characteristic 7, which corresponds to the run-down 53 of the first metering valve 110 and indicates that said valve is being closed. Accordingly, the first end of injection point EIP1 of the first metering valve 110 is set at the point at which this third drop 76 in the third current characteristic 7 makes a transition to a third holding plateau 77. Since the first metering valve 110 is now closed, the further, third current characteristic 7 must correspond to the second current characteristic 6 of the second metering valve 120. Thus, it is possible to infer the holding plateau 62 and the run-down 63 of the second metering valve 120 from the third holding plateau 77 and the following fourth drop 78 in the third current characteristic 7. Finally, when the third current characteristic 7 has fallen to zero, the second end of injection point EIP2 of the second metering valve 120 is set. The time between the first beginning of injection point BIP1 and the second end of injection point EIP2 is defined as the metering time period $t_{Dos}$.

The general shape of the current characteristics 5, 6, 7 is similar in the other embodiments, and therefore only the changes to the current characteristics 5, 6, 7 explained here are described there. Moreover, features which are the same are provided with the same reference signs and they will not be described again below.

A second embodiment of the method is illustrated in FIG. 3. Here too, the metering operations of the two metering valves 110, 120 are carried out simultaneously, at least over part of the metering time period $t_{Dos}$. In this embodiment, furthermore, a quick cutoff 54 is carried out for the first metering valve 110 and a quick cutoff 64 is carried out for the second metering valve 120 by lowering the first electric current $I_1$ and the second electric current $I_2$, respectively, instantaneously to zero, with the result that the respective metering valve 110, 120 closes abruptly. The two quick cutoffs 54, 64 are expediently carried out simultaneously for both metering valves 110, 120 in order to ensure that they are reliably closed at a common point in time, at which the first end of injection point EIP1 and the second end of injection point EIP2 coincide. As a consequence, the metering operations are defined from this common point in time, i.e. from the first end of injection point EIP1 or from the second end of injection point EIP2. In this illustrative embodiment, the mass of reducing agent solution metered in via the first metering valve 110 should be greater than that metered in via the second metering valve 120. The selected first metering time $t_{DV1}$ for the first metering valve 110, starting from the first end of injection point EIP1, is therefore longer than the second metering time $t_{DV2}$ for the second metering valve 120 starting from the second end of injection point EIP2. It follows from this that the second beginning of injection point BIP2 for the second metering valve 120 is at a later time than the first beginning of injection point BIP1 for the second metering valve 110. For another illustrative embodiment, in which the reducing agent mass metered in via the second metering valve 120 is greater, the first current characteristic 5 and the second current characteristic 6 can be interchanged.

By virtue of the fact that the first and second end of injection points EIP1, EIP2 coincide, the third current characteristic 7 of the common electric current $I_g$ changes. After the second holding plateau 75, the common electric current $I_g$ does not fall in stages; instead, there is an instantaneous drop 79 to zero, which corresponds to the two quick cutoffs 54, 64. To ensure that both metering valves 110, 120 are reliably closed, the pressure in the common section 130 of the pressure line 13 can be determined by means of the above-described pressure sensor system (not shown) and then evaluated.

In other embodiments of the method according to the invention, further combinations of the run-down 53, 63 with the quick cutoff 54, 64 can be provided for the metering valves 110, 120. For example, the first metering valve 110 can be ended with run-down 53 and the second metering valve 120 can be ended with quick cutoff 64 or vice versa.

FIG. 4 shows a third embodiment of the method as an extension of the second embodiment in FIG. 3, in which a waiting time $t_W$ is provided for at least one of the metering valves 110, 120 after closure. Waiting for the waiting time $t_W$ ensures that the metering valves 110, 120 are reliably closed. The waiting time $t_W$ can be determined empirically, for example. Since the metering via both metering valves 110, 120 in this illustrative embodiment is once again ended simultaneously with the quick cutoff 54, 64, the waiting time $t_W$ from the two end of injection points EIP1, EIP2 is chosen. In this diagram, the metering operations are divided into time windows $t_{ZF}$, wherein a subsequent time window $t_{ZF}$ begins as soon as the waiting time $t_W$ of the previous time window $t_{ZF}$ has expired. In this illustrative embodiment too, the first metering time $t_{DV1}$ for the first metering valve 110 and the second metering time $t_{DV2}$ for the second metering valve 120 are defined from the end of injection points EIP1, EIP2, thereby determining the beginning of injection points BIP1, BIP2. As a consequence, a first waiting time $t_{W1}$ is provided between the beginning of the time window $t_{ZF}$ and the first beginning of injection point BIP1, this waiting time being allowed to expire before metering via the first metering valve 110 takes place. Similarly, a second waiting time $t_{W2}$ is allowed to expire between the beginning of the time window $t_{ZF}$ and the second beginning of injection point BIP2 before metering via the first metering valve 110 takes place. In order to achieve the time offset between the first beginning of injection point BIP1 and the second beginning of injection point BIP2, the first waiting time $t_{W1}$ and the second waiting time $t_{W2}$ are of different lengths.

In all the embodiments mentioned, the mass of reducing agent metered in, the respective beginning of injection point BIP1, BIP2 and the respective end of injection point EIP1, EIP2 can be determined by means of corresponding diagnostic mechanisms.

The invention claimed is:

1. A method for controlling an SCR system having two metering valves, a first SCR catalytic convertor, a second SCR catalytic convertor, and a feed pump, the first SCR catalytic convertor and the second SCR catalytic convertor being positioned in a common exhaust line of an internal combustion engine, the method comprising:

operating a first metering valve positioned upstream from the first SCR catalytic convertor; and operating a second metering valve positioned upstream from the second SCR catalytic convertor and downstream from the first SCR catalytic convertor, wherein the first and second metering valves are operated in such a way that a reducing agent solution is metered simultaneously via the first and second metering valves, at least over part of a metering time period, wherein the two metering operations are ended simultaneously by quick cutoffs of the respective metering valve, and wherein parameters for the metering operations are determined on the basis of the quick cutoff.

2. The method according to claim 1, wherein the two metering operations start with a time offset.

3. The method according to claim 1, wherein a waiting time before a subsequent metering operation begins is provided after the closure of at least one of the first and second metering valves.

4. The method according to claim 1, further comprising measuring a common electric current, which is used to operate the first and second metering valves.

5. A non-transitory computer-readable storage medium storing instructions that when executed on a computer cause the computer to:

operate a first metering valve positioned upstream from a first SCR catalytic convertor; and operate a second metering valve positioned upstream from a second SCR catalytic convertor and downstream from the first SCR catalytic convertor, wherein the first and second metering valves are operated in such a way that a reducing agent solution is metered simultaneously via the first and second metering valves, at least over part of a metering time period, and wherein the first SCR catalytic convertor and the second SCR catalytic convertor are positioned in a common exhaust line of an internal combustion engine, wherein the two metering operations are ended simultaneously by quick cutoffs of the respective metering valve, and wherein parameters for the metering operations are determined on the basis of the quick cutoff.

6. An electronic control unit which is designed to control an SCR system, wherein the electronic control unit is configured to:

operate a first metering valve positioned upstream from a first SCR catalytic convertor; and operate a second metering valve positioned upstream from a second SCR catalytic convertor and downstream from the first SCR catalytic convertor, wherein the first and second metering valves are operated in such a way that a reducing agent solution is metered simultaneously via the first and second metering valves, at least over part of a metering time period, and wherein the first SCR catalytic convertor and the second SCR catalytic convertor are positioned in a common exhaust line of an internal combustion engine, wherein the two metering operations are ended simultaneously by quick cutoffs of the respective metering valve, and wherein parameters for the metering operations are determined on the basis of the quick cutoff.

* * * * *